(12) United States Patent
Shizu et al.

(10) Patent No.: US 11,996,793 B2
(45) Date of Patent: May 28, 2024

(54) AIR CONDITIONING APPARATUS

(71) Applicant: Mitsubishi Electric Corporation, Tokyo (JP)

(72) Inventors: Keiichiro Shizu, Tokyo (JP); Kazuhide Yamamoto, Tokyo (JP); Masaki Muramatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 47 days.

(21) Appl. No.: 17/777,141

(22) PCT Filed: Feb. 20, 2020

(86) PCT No.: PCT/JP2020/006895
§ 371 (c)(1),
(2) Date: May 16, 2022

(87) PCT Pub. No.: WO2021/166187
PCT Pub. Date: Aug. 26, 2021

(65) Prior Publication Data
US 2022/0399846 A1  Dec. 15, 2022

(51) Int. Cl.
*H02P 25/18* (2006.01)
*F25B 49/02* (2006.01)
(Continued)

(52) U.S. Cl.
CPC .......... *H02P 25/18* (2013.01); *F25B 49/025* (2013.01); *H02K 3/46* (2013.01); *H02K 5/225* (2013.01);
(Continued)

(58) Field of Classification Search
CPC .......... H02P 25/18; H02P 27/06; H02K 3/46; H02K 5/225; F25B 49/025; F25B 49/022; F25B 2600/0253
See application file for complete search history.

(56) References Cited

U.S. PATENT DOCUMENTS 4,477,760 A * 10/1984 Kuznetsov .............. H02P 25/20
                                                       318/776
4,644,242 A *  2/1987 Takata .................... H02P 25/20
                                                       318/773
(Continued)

FOREIGN PATENT DOCUMENTS

JP    2012-227979 A    11/2012
JP    2016-085005 A     5/2016
(Continued)

OTHER PUBLICATIONS

International Search Report of the International Searching Authority dated Apr. 7, 2020 in connection with International Application No. PCT/JP2020/006895 (and English machine translation).

(Continued)

Primary Examiner — Thai T Dinh
(74) Attorney, Agent, or Firm — Posz Law Group, PLC

(57) ABSTRACT

An air conditioning apparatus includes an indoor unit and an outdoor unit. The outdoor unit includes a compressor that compresses a refrigerant and a motor drive apparatus that drives the compressor. The motor drive apparatus includes an inverter that converts a direct-current voltage into an alternating-current voltage and a motor that operates on the alternating-current voltage from the inverter. The motor includes six stator windings that are each openable at both ends. The motor drive apparatus further includes a connection state switching unit that includes a function of switching a connection state of the six stator windings of the motor among at least four types of connection states.

7 Claims, 8 Drawing Sheets

(51) Int. Cl.
    *H02K 3/46*      (2006.01)
    *H02K 5/22*      (2006.01)
    *H02P 27/06*     (2006.01)
(52) U.S. Cl.
    CPC ........ *H02P 27/06* (2013.01); *F25B 2600/021* (2013.01)

(56) References Cited

U.S. PATENT DOCUMENTS

| | | | | |
|---|---|---|---|---|
| 6,135,720 | A | * | 10/2000 | Boller .................. F04C 28/08 318/773 |
| 6,362,592 | B1 | * | 3/2002 | Chrappan Soldavini .................... H02P 6/085 318/771 |
| 2020/0021222 | A1 | | 1/2020 | Nigo |
| 2020/0204101 | A1 | | 6/2020 | Tokuda et al. |

FOREIGN PATENT DOCUMENTS

| | | | | |
|---|---|---|---|---|
| JP | 2016085005 | A | * | 5/2016 |
| WO | 2018/078840 | A1 | | 5/2018 |
| WO | WO-2018078839 | A1 | * | 5/2018 .............. F24F 11/46 |
| WO | 2019/021450 | A1 | | 1/2019 |
| WO | WO-2019021450 | A1 | * | 1/2019 .............. F04B 49/06 |
| WO | 2019/026282 | A1 | | 2/2019 |

OTHER PUBLICATIONS

Office Action dated Oct. 31, 2023 issued in corresponding Chinese Patent Application No. 202080096638.3 (and partial English machine translation).

* cited by examiner

AIR CONDITIONING APPARATUS

CROSS REFERENCE TO RELATED APPLICATION

This application is a U.S. National Stage Application of International Patent No. PCT/JP2020/006895 filed on Feb. 20, 2020, the disclosure of which is incorporated herein by reference.

TECHNICAL FIELD

The present disclosure relates to an air conditioning apparatus that performs air conditioning.

BACKGROUND

A known motor drive apparatus is capable of switching a connection state of stator windings of a motor. Specifically, the known motor drive apparatus switches between a star connection and a delta connection with relays that use coils. For example, a motor drive apparatus that drives a compressor of an air conditioning apparatus preferably drives a motor in a star connection state at lower load conditions that contribute to annual power consumption to a relatively high degree and preferably drives the motor in a delta connection state at higher load conditions. In this way, improved drive efficiency is enabled at the lower load conditions, and increased output is enabled at the higher load conditions.

Patent Literature 1 suggests that increased motor drive efficiency is enabled by selecting the star connection at a revolution speed corresponding to an intermediate heating condition and the delta connection at a revolution speed corresponding to a rated heating condition. In Patent Literature 1, the revolution speed means rotational speed. In the air conditioning apparatus, the switching between the star connection and the delta connection is done on the basis of respective intake air temperatures of an outdoor unit and an indoor unit and a difference between these intake air temperatures, thus enabling reduced power consumption during a heating season.

PATENT LITERATURE

Patent Literature 1: International Publication No. WO 2019/021450

Standard conditions for the rated heating condition and a rated cooling condition are defined in Japanese Industrial Standard "JIS C 8615-1: 2013". The difference between the intake air temperatures as measured by dry-bulb temperatures is 13° C. for the rated heating condition and 8° C. for the rated cooling condition. Required refrigeration capacity is greater for heating than for cooling. The refrigeration capacity at the intermediate heating condition is about one half of the capacity at the rated heating condition, and the refrigeration capacity at an intermediate cooling condition is also about one half of the capacity at the rated cooling condition.

The technique disclosed by Patent Literature 1 makes no distinction between heating and cooling as to the revolution speed N1 of a motor that corresponds to the intermediate condition and the revolution speed N2 of the motor that corresponds to the rated condition. Since the required refrigeration capacity varies between heating and cooling as described above, the revolution speeds N1 and N2 also vary between heating and cooling. Therefore, there are different revolution speeds corresponding to respective four operating conditions. While Patent Literature 1 discloses the two connection states of the stator windings, that is to say, the star connection and the delta connection, there are revolution speeds at which the motor drive efficiency is lower with the technique disclosed in Patent Literature 1. In other words, although the technique disclosed in Patent Literature 1 enables minimized power consumption during the heating season, this technique does not enable minimized power consumption during a cooling season, thus making it difficult to minimize the annual power consumption.

SUMMARY

The present disclosure has been made in view of the above, and an object of the present disclosure is to obtain an air conditioning apparatus that reduces annual power consumption further.

In order to solve the above-stated problem and achieve the object, an air conditioning apparatus according to the present disclosure includes an indoor unit and an outdoor unit. The outdoor unit includes a compressor that compresses a refrigerant and a motor drive apparatus that drives the compressor. The motor drive apparatus includes an inverter that converts a direct-current voltage into an alternating-current voltage and a motor that operates on the alternating-current voltage from the inverter. The motor includes six stator windings that are each openable at both ends. The motor drive apparatus further includes a connection state switching unit that includes a function of switching a connection state of the six stator windings of the motor among at least four types of connection states. Each of the six stator windings has an adjusted number of turns that causes the motor to have, when an induced voltage of the motor reaches a maximum voltage that can be output by the inverter, a rotational speed that varies among the at least four types of connection states. The rotational speed is higher in a delta connection state than in a star connection state among the at least four types of connection states.

The air conditioning apparatus according to the present disclosure is capable of reducing annual power consumption further.

DETAILED DESCRIPTION

With reference to the drawings, a detailed description is hereinafter provided of air conditioning apparatuses according to embodiments.

First Embodiment

Figure 1:
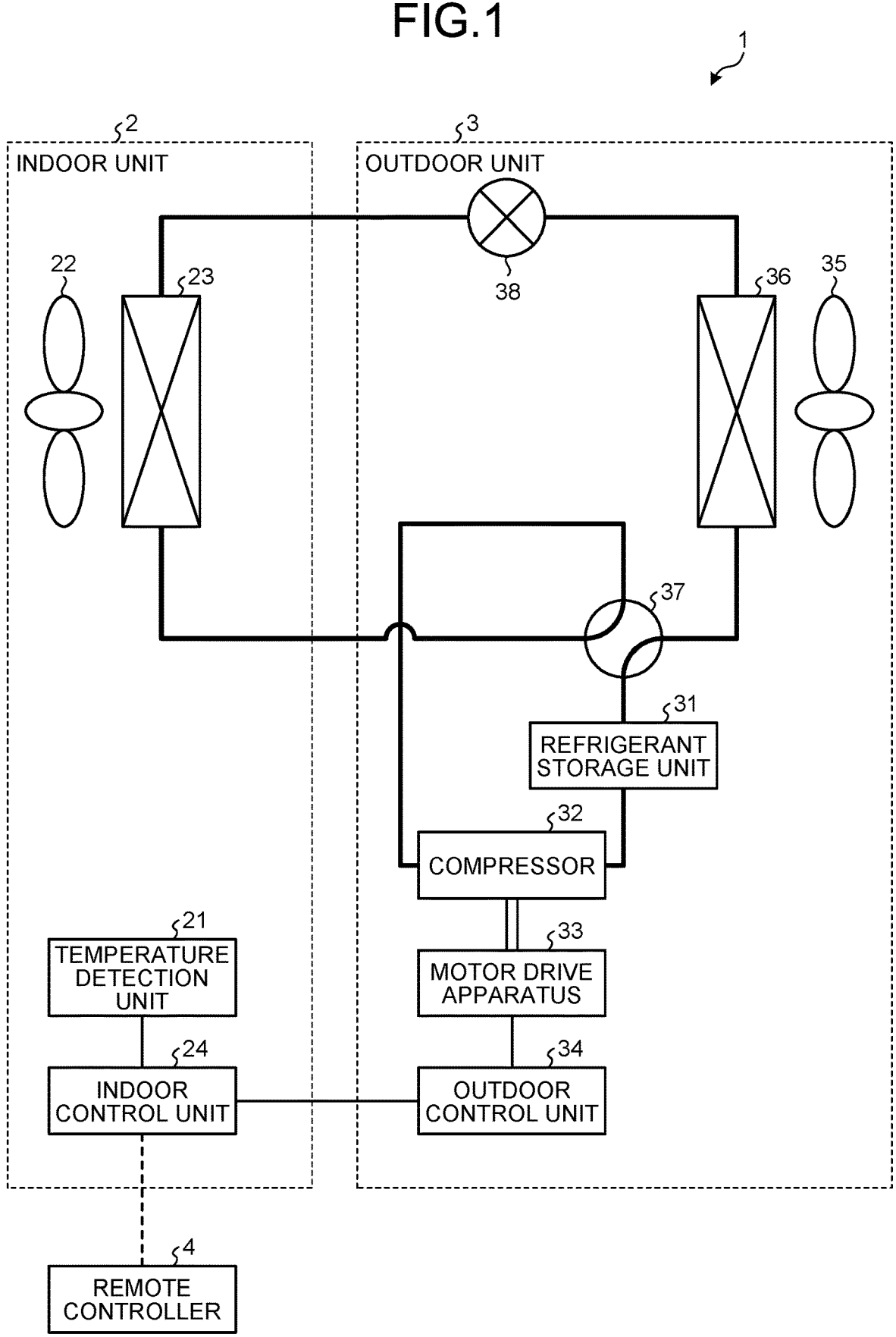
FIG. 1 is a diagram illustrating a configuration of an air conditioning apparatus according to a first embodiment.

FIG. 1 is a diagram illustrating a configuration of an air conditioning apparatus 1 according to the first embodiment. The air conditioning apparatus 1 includes an indoor unit 2, an outdoor unit 3, and a remote controller 4. The indoor unit 2 includes a temperature detection unit 21 that detects temperature of a room with the indoor unit 2. The temperature of the room with the indoor unit 2 is hereinafter described as "indoor temperature". The indoor unit 2 further includes an indoor fan 22 that causes motion to air and an indoor heat exchanger 23 that causes heat exchange between the air and a refrigerant. For example, the temperature detection unit 21 is on a relatively upstream side of an air course that is created by the indoor fan 22. In a specific example, the temperature detection unit 21 is disposed so that the indoor heat exchanger 23 is between the temperature detection unit 21 and the indoor fan 22. The indoor unit 2 further includes an indoor control unit 24 that controls constituent elements of the air conditioning apparatus 1.

The indoor control unit 24 includes a function of determining a heat exchange quantity required in the air conditioning apparatus 1 on the basis of an instruction that a user (not illustrated) gives by operating the remote controller 4 and the indoor temperature detected by the temperature detection unit 21. Examples of the instruction from the user include a target temperature of the room with the indoor unit 2. The target temperature is hereinafter described as "set temperature".

The outdoor unit 3 includes a refrigerant storage unit 31 that stores the refrigerant, a compressor 32 that compresses the refrigerant, a motor drive apparatus 33 that drives the compressor 32, and an outdoor control unit 34 that controls the motor drive apparatus 33. The outdoor control unit 34 controls the motor drive apparatus 33 on the basis of control of the indoor control unit 24, which is included in the indoor unit 2. The outdoor unit 3 further includes an outdoor fan 35 that causes motion to air, an outdoor heat exchanger 36 that causes heat exchange between the air and the refrigerant, a four-way valve 37 that switches a refrigerant passage, and a decompression unit 38 that decompresses the refrigerant.

The indoor control unit 24 includes functions of determining a rotational speed of the indoor fan 22, a rotational speed of the compressor 32, a rotational speed of the outdoor fan 35, and how to operate the four-way valve 37. Each of the rotational speeds refers to the number of revolutions per unit time.

Figure 2:
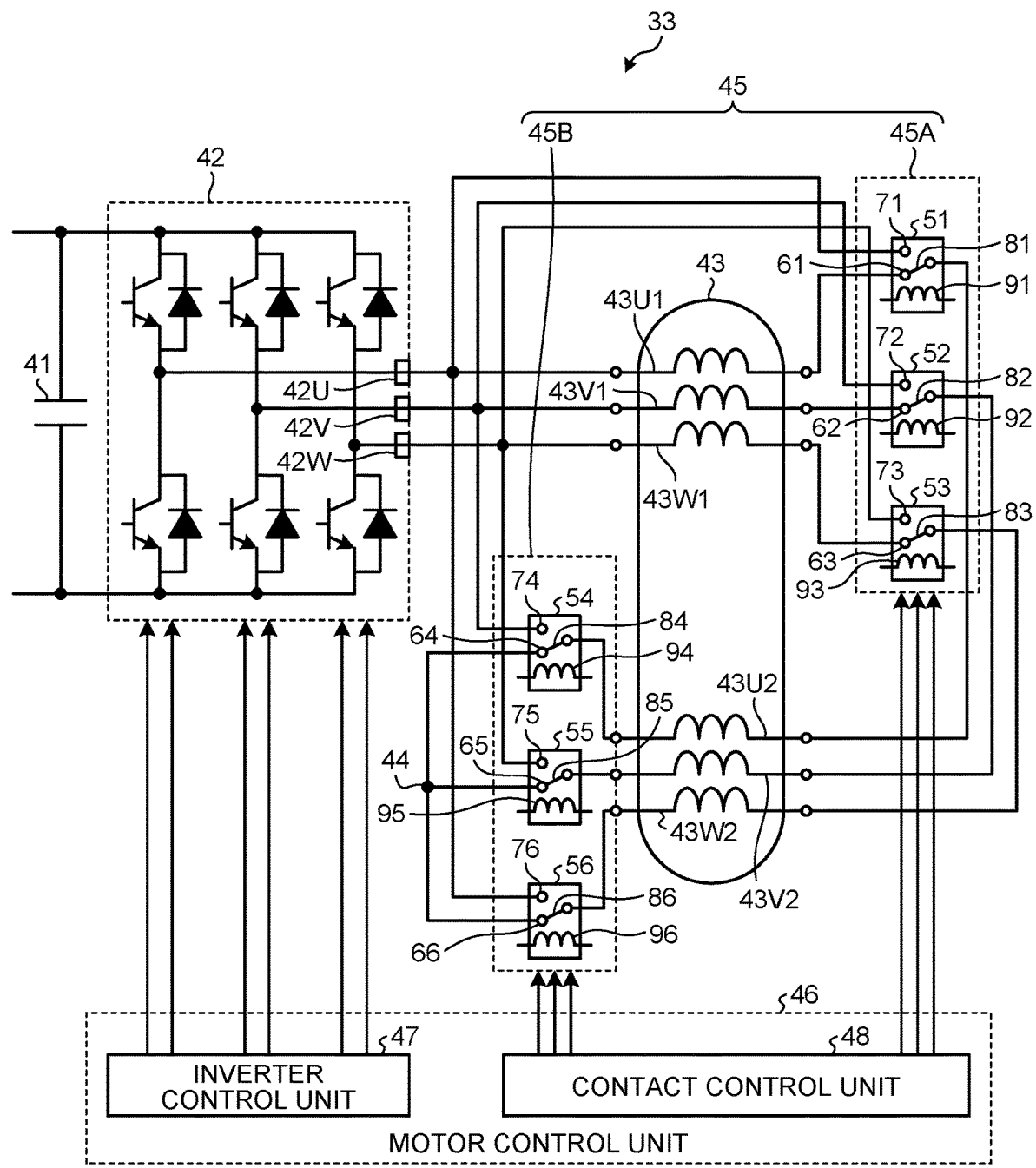
FIG. 2 is a diagram illustrating a configuration of a motor drive apparatus of the air conditioning apparatus according to the first embodiment.

FIG. 2 is a diagram illustrating a configuration of the motor drive apparatus 33 of the air conditioning apparatus 1 according to the first embodiment. The motor drive apparatus 33 includes a capacitor 41 that stores electric charge and an inverter 42 that converts a direct-current voltage into an alternating-current voltage. The inverter 42 includes a plurality of semiconductor switching elements. The motor drive apparatus 33 further includes a motor 43 that operates on the alternating-current voltage from the inverter 42. The motor 43 includes six stator windings. Specifically, the motor 43 includes a first stator winding 43U1, a second stator winding 43V1, a third stator winding 43W1, a fourth stator winding 43U2, a fifth stator winding 43V2, and a sixth stator winding 43W2. Each of the six stator windings is openable at both ends. Therefore, a connection state of the six stator windings is switchable.

The motor drive apparatus 33 further includes a neutral terminal 44 for switching the connection state of the six stator windings of the motor 43 and a connection state switching unit 45 that includes a function of switching the connection state of the six stator windings of the motor 43 among four types of connection states. The connection state switching unit 45 includes a first connection state switching unit 45A and a second connection state switching unit 45B. The first connection state switching unit 45A and the second connection state switching unit 45B are described in detail later. The motor drive apparatus 33 further includes a motor control unit 46 that controls the inverter 42 and the connection state switching unit 45. The motor control unit 46 includes an inverter control unit 47 that controls the inverter 42 and a contact control unit 48 that controls the connection state switching unit 45. The motor control unit 46 may be included in the outdoor control unit 34.

The capacitor 41 holds direct-current power from a power conversion apparatus (not illustrated) as the direct-current voltage. The power conversion apparatus converts alternating-current power from an alternating-current power supply (not illustrated) into the direct-current power. Under the control of the inverter control unit 47, the inverter 42 converts the direct-current voltage held by the capacitor 41 into the alternating-current voltage by pulse-width modulation and applies the alternating-current voltage to the motor 43 to be driven. Specifically, the inverter 42 includes a first output terminal 42U, a second output terminal 42V, and a third output terminal 42W, and the alternating-current voltage is applied to the motor 43 from the first output terminal 42U, the second output terminal 42V, and the third output terminal 42W. The control that the inverter control unit 47 performs is a publicly known technique.

As described above, the motor 43 includes the six stator windings, and each of the six stator windings is openable at each of the ends. Therefore, the connection state of the six stator windings is switchable. The first stator winding 43U1, the second stator winding 43V1, and the third stator winding 43W1 have the same resistance. The first stator winding 43U1, the second stator winding 43V1, and the third stator winding 43W1 also have the same inductance. The fourth stator winding 43U2, the fifth stator winding 43V2, and the sixth stator winding 43W2 have the same resistance. The fourth stator winding 43U2, the fifth stator winding 43V2, and the sixth stator winding 43W2 also have the same inductance. One of the ends of the first stator winding 43U1 is connected to the first output terminal 42U of the inverter 42. One of the ends of the second stator winding 43V1 is connected to the second output terminal 42V of the inverter 42. One of the ends of the third stator winding 43W1 is connected to the third output terminal 42W of the inverter 42.

The first connection state switching unit 45A includes a first relay 51, a second relay 52, and a third relay 53 for switching the connection state of the six stator windings in the motor 43. The first relay 51, the second relay 52, and the third relay 53 are changeover (C) contact relays. The first relay 51 includes a contact 61 connected to the other end of the first stator winding 43U1, a contact 71 connected to the first output terminal 42U of the inverter 42, a contact plate 81 connected to one of the ends of the fourth stator winding 43U2, and a coil 91 that operates the contact plate 81. In the absence of current through the coil 91, the contact plate 81 is connected to the contact 61. With the current flowing through the coil 91, the contact plate 81 is connected to the contact 71. The other end of the first stator winding 43U1 is the other one of the two ends of the first stator winding 43U1 that is not connected to the first output terminal 42U.

The second relay 52 includes a contact 62 connected to the other end of the second stator winding 43V1, a contact 72 connected to the second output terminal 42V of the inverter 42, a contact plate 82 connected to one of the ends of the fifth stator winding 43V2, and a coil 92 that operates the contact plate 82. In the absence of the current through the coil 92, the contact plate 82 is connected to the contact 62. With the current flowing through the coil 92, the contact plate 82 is connected to the contact 72. The other end of the second stator winding 43V1 is the other one of the two ends of the second stator winding 43V1 that is not connected to the second output terminal 42V.

The third relay 53 includes a contact 63 connected to the other end of the third stator winding 43W1, a contact 73 connected to the third output terminal 42W of the inverter 42, a contact plate 83 connected to one of the ends of the sixth stator winding 43W2, and a coil 93 that operates the contact plate 83. In the absence of the current through the coil 93, the contact plate 83 is connected to the contact 63. With the current flowing through the coil 93, the contact plate 83 is connected to the contact 73. The other end of the third stator winding 43W1 is the other one of the two ends of the third stator winding 43W1 that is not connected to the third output terminal 42W.

The second connection state switching unit 45B includes a fourth relay 54, a fifth relay 55, and a sixth relay 56 for switching the connection state of the six stator windings in the motor 43. The fourth relay 54, the fifth relay 55, and the sixth relay 56 are C contact relays. The fourth relay 54 includes a contact 64 connected to the neutral terminal 44, a contact 74 connected to the second output terminal 42V of the inverter 42, a contact plate 84 connected to the other end of the fourth stator winding 43U2, and a coil 94 that operates the contact plate 84. In the absence of the current through the coil 94, the contact plate 84 is connected to the contact 64. With the current flowing through the coil 94, the contact plate 84 is connected to the contact 74. The other end of the fourth stator winding 43U2 is the other one of the two ends of the fourth stator winding 43U2 that is not connected to the first relay 51.

The fifth relay 55 includes a contact 65 connected to the neutral terminal 44, a contact 75 connected to the third output terminal 42W of the inverter 42, a contact plate 85 connected to the other end of the fifth stator winding 43V2, and a coil 95 that operates the contact plate 85. In the absence of the current through the coil 95, the contact plate 85 is connected to the contact 65. With the current flowing through the coil 95, the contact plate 85 is connected to the contact 75. The other end of the fifth stator winding 43V2 is the other one of the two ends of the fifth stator winding 43V2 that is not connected to the second relay 52.

The sixth relay 56 includes a contact 66 connected to the neutral terminal 44, a contact 76 connected to the first output terminal 42U of the inverter 42, a contact plate 86 connected to the other end of the sixth stator winding 43W2, and a coil 96 that operates the contact plate 86. In the absence of the current through the coil 96, the contact plate 86 is connected to the contact 66. With the current flowing through the coil 96, the contact plate 86 is connected to the contact 76. The other end of the sixth stator winding 43W2 is the other one of the two ends of the sixth stator winding 43W2 that is not connected to the third relay 53.

The contact control unit 48 controls the connection state switching unit 45. Specifically, the contact control unit 48 controls the contact plates 81 to 86. By controlling the contact plates 81 to 86, the contact control unit 48 switches the connection state of the six stator windings of the motor 43. In other words, under the control of the contact control unit 48, the connection state switching unit 45 switches the connection state of the six stator windings of the motor 43.

As described above, in the absence of the current through the coil 91 of the first relay 51, the contact plate 81 is connected to the contact 61. Similarly, with the current flowing through none of the coils 92 to 96 of the second through sixth relays 52 to 56, the contact plates 82 to 86 are connected to the contacts 62 to 66, respectively.

In other words, with the current flowing through none of the coils, the first and fourth stator windings 43U1 and 43U2 are connected in series, the second and fifth stator windings 43V1 and 43V2 are connected in series, the third and sixth stator windings 43W1 and 43W2 are connected in series, and the other end of each of the fourth through sixth stator windings 43U2, 43V2, and 43W2 is connected to the neutral terminal 44. Therefore, with the current flowing through none of the coils, the connection state of the six stator windings of the motor 43 is a star connection state. With the current flowing through none of the coils, the star connection state of the six stator windings is described as "connection state I".

With the current flowing through the coils 91 to 93 but not through the coils 94 to 96, the contact plate 81 of the first relay 51 is connected to the contact 71, the contact plate 82 of the second relay 52 is connected to the contact 72, the contact plate 83 of the third relay 53 is connected to the contact 73, the contact plate 84 of the fourth relay 54 is connected to the contact 64, the contact plate 85 of the fifth relay 55 is connected to the contact 65, and the contact plate 86 of the sixth relay 56 is connected to the contact 66.

In other words, with the current flowing through the coils 91 to 93 but not through the coils 94 to 96, the other end of each of the first through third stator windings 43U1, 43V1, and 43W1 is open, so that no current flows through the first through third stator windings 43U1, 43V1, and 43W1. The fourth through sixth stator windings 43U2, 43V2, and 43W2 are connected, at the other ends, to the neutral terminal 44.

Therefore, with the current flowing through the coils 91 to 93 but not through the coils 94 to 96, the connection state of the six stator windings of the motor 43 is a star connection state. The star connection state of the six stator windings with the current flowing through the coils 91 to 93 but not through the coils 94 to 96 is described as "connection state II".

With the current flowing through the coils 94 to 96 but not through the coils 91 to 93, the contact plate 81 of the first relay 51 is connected to the contact 61, the contact plate 82 of the second relay 52 is connected to the contact 62, the contact plate 83 of the third relay 53 is connected to the contact 63, the contact plate 84 of the fourth relay 54 is connected to the contact 74, the contact plate 85 of the fifth relay 55 is connected to the contact 75, and the contact plate 86 of the sixth relay 56 is connected to the contact 76.

In other words, with the current flowing through the coils 94 to 96 but not through the coils 91 to 93, the first and fourth stator windings 43U1 and 43U2 are connected in series, the second and fifth stator windings 43V1 and 43V2 are connected in series, and the third and sixth stator windings 43W1 and 43W2 are connected in series. Moreover, the other ends of the fourth through sixth stator windings 43U2, 43V2, and 43W2 are connected respectively to the second, third, and first output terminals 42V, 42W, and 42U of the inverter 42.

Therefore, with the current flowing through the coils 94 to 96 but not through the coils 91 to 93, the connection state of the six stator windings of the motor 43 is a delta connection state. The delta connection state of the six stator windings with the current flowing through the coils 94 to 96 but not through the coils 91 to 93 is described as "connection state III".

With the current flowing through the coils 91 to 96, the contact plate 81 of the first relay 51 is connected to the contact 71, the contact plate 82 of the second relay 52 is connected to the contact 72, the contact plate 83 of the third relay 53 is connected to the contact 73, the contact plate 84 of the fourth relay 54 is connected to the contact 74, the contact plate 85 of the fifth relay 55 is connected to the contact 75, and the contact plate 86 of the sixth relay 56 is connected to the contact 76.

In other words, with the current flowing through the coils 91 to 96, the other end of each of the first through third stator windings 43U1, 43V1, and 43W1 is open, and the other ends of the fourth through sixth stator windings 43U2, 43V2, and 43W2 are connected respectively to the second, third, and first output terminals 42V, 42W, and 42U of the inverter 42.

Therefore, with the current flowing through the coils 91 to 96, the connection state of the six stator windings of the motor 43 is a delta connection state. The delta connection state of the six stator windings with the current flowing through the coils 91 to 96 is described as "connection state IV".

Figure 3:
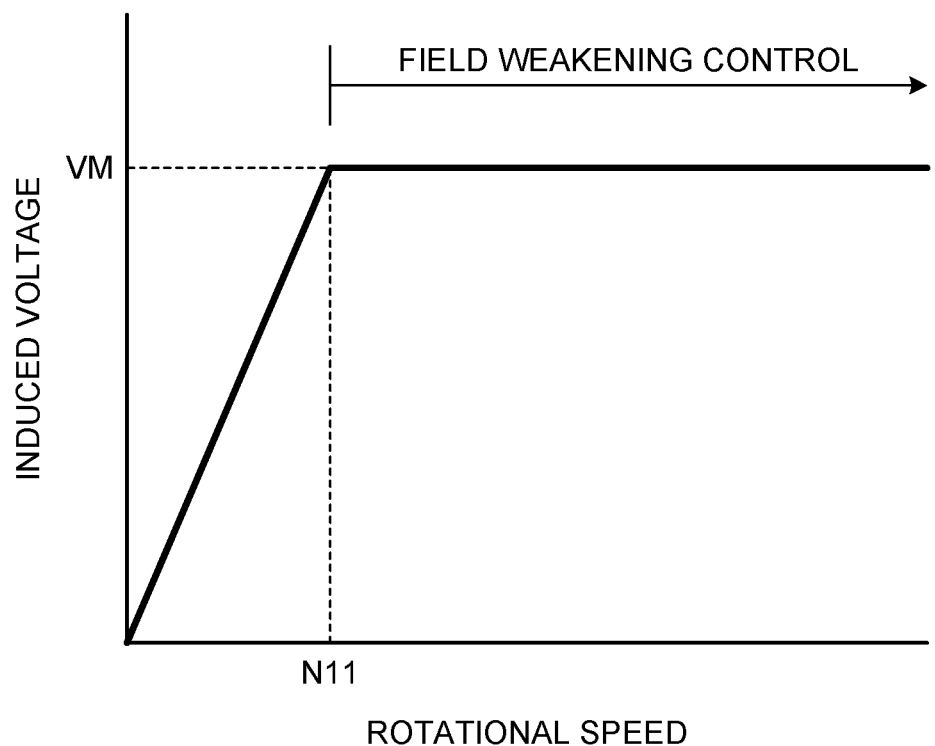
FIG. 3 is a graph illustrating a relationship between induced voltage and rotational speed of a motor in the motor drive apparatus of the air conditioning apparatus according to the first embodiment.

FIG. 3 is a graph illustrating a relationship between induced voltage and rotational speed of the motor 43 in the motor drive apparatus 33 of the air conditioning apparatus 1 according to the first embodiment. The relationship illustrated in FIG. 3 is between the induced voltage of the motor 43 at the output terminals of the inverter 42 and the rotational speed of the motor 43 in the motor drive apparatus 33. The induced voltage corresponds to line voltage. The induced voltage and the rotational speed have the relationship illustrated in FIG. 3 when the connection state of the six stator windings of the motor 43 is the connection state I.

The induced voltage is proportional to the product of a field magnetic field and the rotational speed. When the field magnetic field is constant, the induced voltage is proportional to the rotational speed. A maximum value VM of the line voltage that the inverter 42 is capable of outputting is the direct-current voltage of the capacitor 41. Since the line voltage cannot be higher than the maximum value VM, the inverter 42 performs field weakening control when the line voltage from the inverter 42 reaches the maximum value VM. The field weakening control starts at a rotational speed N11 of the motor 43.

The field weakening control, which is performed to control the motor 43, reduces the induced voltage of the motor 43 by passing a d-axis phase current through each of the first through sixth stator windings 43U1, 43V1, 43W1, 43U2, 43V2, and 43W2. The d-axis phase current flows in a direction that counteracts a magnetic flux of permanent magnets. The d-axis phase current is described as "weakening current". Since the field weakening control requires the weakening current in addition to the current that produces normal motor torque, increased copper loss results from resistance of each stator winding, and the inverter 42 also has increased conduction loss.

Figure 4:
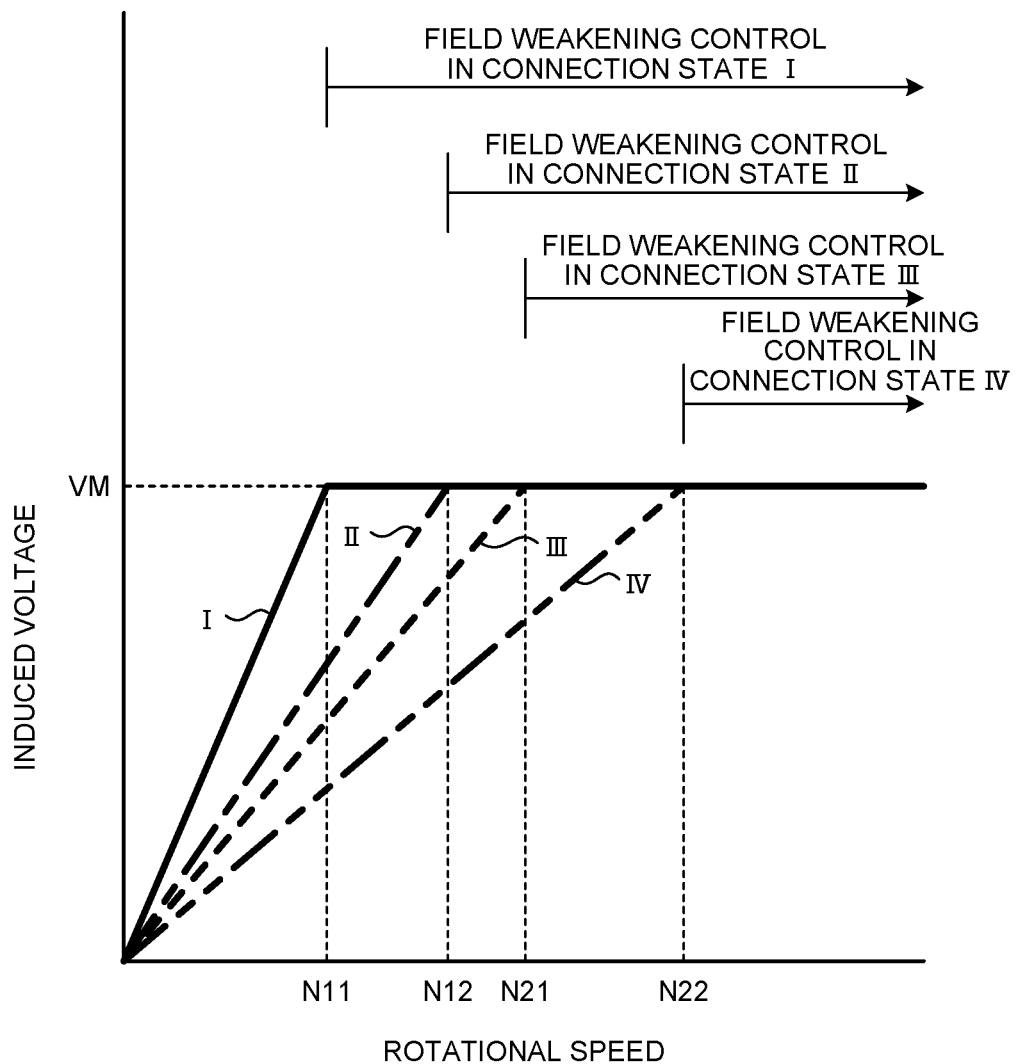
FIG. 4 is a graph illustrating, for each of four types of connection states of six stator windings of the motor, a relationship between the induced voltage and the rotational speed of the motor in the motor drive apparatus of the air conditioning apparatus according to the first embodiment.

FIG. 4 is a graph illustrating, for each of the four types of connection states of the six stator windings of the motor 43, a relationship between the induced voltage and the rotational speed of the motor 43 in the motor drive apparatus 33 of the air conditioning apparatus 1 according to the first embodiment. The relationship illustrated in FIG. 4 for each of the above-described four types of connection states is between the induced voltage of the motor 43 at the output terminals of the inverter 42 and the rotational speed of the motor 43.

When the induced voltage reaches the maximum value VM in the connection state I, the field weakening control starts at the rotational speed N11 of the motor 43. The maximum value VM is the maximum line voltage that the inverter 42 is capable of outputting. When the induced voltage reaches the maximum value VM in the connection state II, the field weakening control starts at a rotational speed N12 of the motor 43. When the induced voltage reaches the maximum value VM in the connection state III, the field weakening control starts at a rotational speed N21 of the motor 43. When the induced voltage reaches the maximum value VM in the connection state IV, the field weakening control starts at a rotational speed N22 of the motor 43. In the example of FIG. 4, each stator winding has an adjusted number of turns so that N21 is larger than N12. Moreover, each of the six stator windings has the adjusted number of turns that causes the motor 43 to have, when the induced voltage of the motor 43 reaches the maximum value VM that can be output by the inverter 42, the rotational speed that varies among the four types of connection states.

Switching the connection state from the connection state I to the connection state II causes smaller resistance and smaller inductance between the output terminal of the inverter 42 and the neutral terminal 44, thus causing the motor 43 to have a lower induced voltage at the same rotational speed. Therefore, when the line voltage from the inverter 42 reaches the maximum value VM, the rotational speed of the motor 43 is higher in the connection state II than in the connection state I.

Switching the connection state from the connection state I to the connection state III refers to switching the connection state from the star connection state to the delta connection state without changing the resistance and the inductance, and the line voltage reduces to $1/\sqrt{3}$ times the line voltage of the star connection accordingly. The line voltage's reduction to $1/\sqrt{3}$ times the line voltage of the star connection in the case of the delta connection means that when the line voltage from the inverter 42 reaches the maximum value VM, the rotational speed of the motor 43 in the delta connection state is $\sqrt{3}$ times the rotational speed of the motor 43 in the star connection state. In other words, the rotational speed N21 in the case of the connection state III is $\sqrt{3}$ times the rotational speed N11 in the case of the connection state I. The above also applies when the connection state is switched from the connection state II to the connection state IV. In other words, the rotational speed N22 in the case of the connection state IV is $\sqrt{3}$ times the rotational speed N12 in the case of the connection state II.

Switching the connection state in the order of the connection state I, the connection state II, the connection state III, and the connection state IV enables the induced voltage of the motor 43 to decrease even when the rotational speed of the motor 43 increases. In other words, the rotational speed at which the field weakening control starts is enabled to be increasingly higher. The copper loss due to the weakening current is restrained thus, and motor efficiency and the motor torque are prevented from decreasing.

Figure 5:
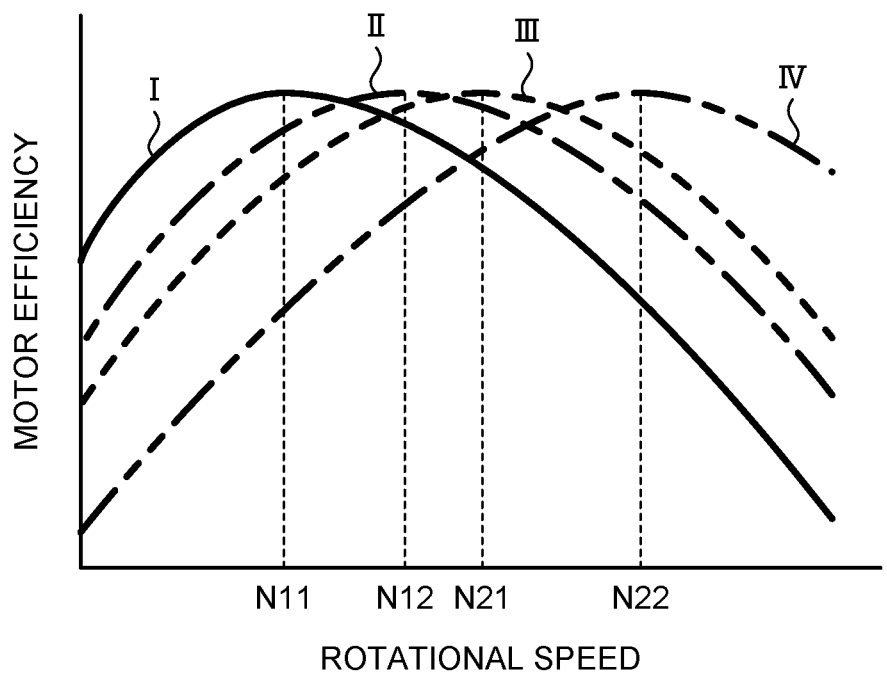
FIG. 5 is a graph illustrating each relationship between motor efficiency and the rotational speed of the motor in the air conditioning apparatus according to the first embodiment.

FIG. 5 is a graph illustrating each relationship between the motor efficiency and the rotational speed of the motor 43 in the air conditioning apparatus 1 according to the first embodiment. The relationship illustrated in FIG. 5 for each of the connection states I, II, III, and IV is between the motor efficiency and the rotational speed of the motor 43. As the rotational speed of the motor 43 increases, the motor efficiency increases and reaches a peak immediately after the field weakening control starts. As the rotational speed of the motor 43 increases further, the weakening current flowing in the motor 43 increases, thus increasing the copper loss and decreasing the motor efficiency. Each relationship between overall efficiency that is the product of the motor efficiency and inverter efficiency and the rotational speed of the motor 43 is also represented by a curve similar to the curve in FIG. 5.

As described above with reference to FIG. 2, the types of connection states of the six stator windings of the motor 43 are four in number in the motor drive apparatus 33 of the air conditioning apparatus 1 according to the first embodiment. As described with reference to FIG. 5, there are also four motor efficiency peaks corresponding to the respective four types of connection states of the six stator windings. By matching, to the above four peaks, the rotational speeds of the motor 43 that correspond to four operating conditions of the air conditioning apparatus 1, that is to say, an intermediate heating condition, an intermediate cooling condition, a rated heating condition, and a rated cooling condition, drive efficiency of the motor 43 is prevented from decreasing at every one of the four operating conditions.

Since required refrigeration capacity is greater at the rated heating condition than at the rated cooling condition, when the line voltage from the inverter 42 reaches the maximum value VM, the motor 43 preferably has the rotational speed N11 at the intermediate cooling condition, the rotational speed N12 at the intermediate heating condition, the rotational speed N21 at the rated cooling condition, and the rotational speed N22 at the rated heating condition.

As described above, the motor drive apparatus 33 in the outdoor unit 3 of the air conditioning apparatus 1 according to the first embodiment includes the connection state switching unit 45 that includes the function of switching the connection state of the six stator windings of the motor 43 among the four types of connection states. Therefore, the air conditioning apparatus 1 enables the drive efficiency of the motor 43 to peak at the rotational speeds corresponding to the respective four operating conditions, namely, the intermediate heating condition, the intermediate cooling condition, the rated heating condition, and the rated cooling condition. This means that the air conditioning apparatus 1 enables minimized power consumption both during a heating season and during a cooling season. Therefore, the air conditioning apparatus 1 is capable of reducing annual power consumption further.

In order to achieve this further reduction of the annual power consumption, the connection state switching unit 45 causes the connection state of the six stator windings in a heating operation mode of the air conditioning apparatus 1 to differ from the connection state of the six stator windings in a cooling operation mode.

When the six stator windings of the air conditioning apparatus 1 are in the connection state among the four types of connection states that causes the induced voltage of the motor 43 to reach, at the lowest rotational speed of the motor 43, the maximum voltage that can be output by the inverter 42, no current flows through the coils of all of the first through sixth relays 51 to 56 to operate the contact plates.

Figure 6:
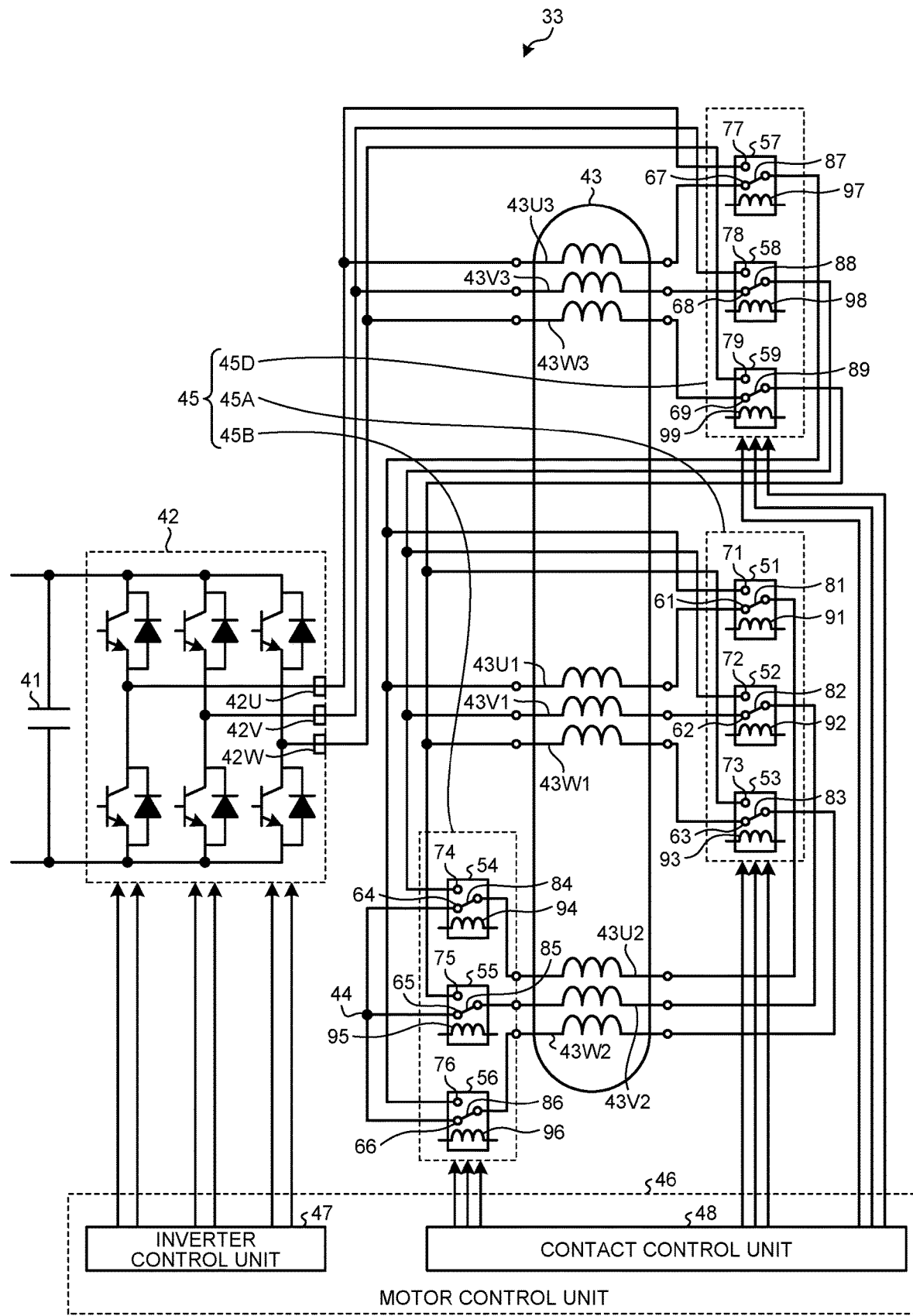
FIG. 6 is a diagram illustrating a configuration of a variation of the motor drive apparatus in the air conditioning apparatus according to the first embodiment.

The connection state switching unit 45 may include a function of switching the connection state of the six stator windings among at least five types of connection states. In an example of FIG. 6, a third connection state switching unit 45D is added, enabling the connection state of nine stator windings of the motor 43 to be switched among eight types of connection states. FIG. 6 is a diagram illustrating a configuration of a variation of the motor drive apparatus 33 in the air conditioning apparatus 1 according to the first embodiment.

The third connection state switching unit 45D includes a relay 57, a relay 58, and a relay 59. The motor 43 includes the nine stator windings, that is to say, the first through sixth stator windings 43U1, 43V1, 43W1, 43U2, 43V2, and 43W2, a seventh stator winding 43U3, an eighth stator winding 43V3, and a ninth stator winding 43W3. The relay 57 includes a contact 67, a contact 77, a contact plate 87, and a coil 97. The relay 58 includes a contact 68, a contact 78, a contact plate 88, and a coil 98. The relay 59 includes a contact 69, a contact 79, a contact plate 89, and a coil 99.

Each of the nine stator windings has an adjusted number of turns in order for the drive efficiency of the motor 43 to peak at the rotational speeds corresponding to the respective four operating conditions (i.e., the intermediate heating condition, the intermediate cooling condition, the rated heating condition, and the rated cooling condition) of the air conditioning apparatus 1 that correspond to respective four of the above eight types of connection states. Therefore, the air conditioning apparatus 1 enables minimized power consumption both during the heating season and during the cooling season, thus being capable of reducing the annual power consumption further. Since the drive efficiency of the motor 43 also peaks at rotational speeds corresponding to respective four other operating conditions different from the above four operating conditions, the annual power consumption can be reduced further if connection states are selected appropriately.

Second Embodiment

Figure 7:
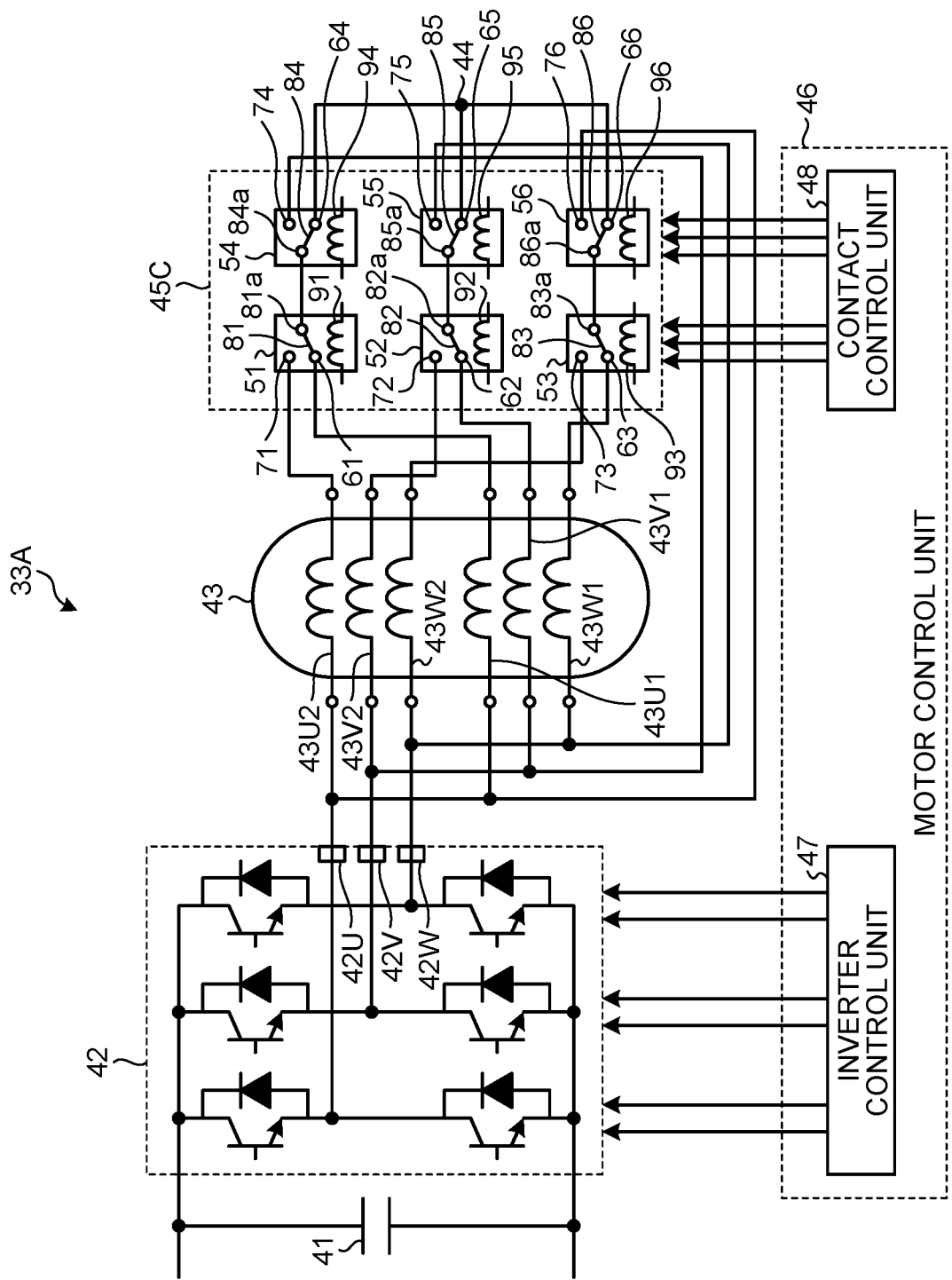
FIG. 7 is a diagram illustrating a configuration of a motor drive apparatus of an air conditioning apparatus according to a second embodiment.

FIG. 7 is a diagram illustrating a configuration of a motor drive apparatus 33A of an air conditioning apparatus according to the second embodiment. Although not illustrated, the indoor unit 2, an outdoor unit, and the remote controller 4 are included in the air conditioning apparatus according to the second embodiment as in the air conditioning apparatus 1 according to the first embodiment. The outdoor unit of the second embodiment includes the motor drive apparatus 33A and all the constituent elements of the outdoor unit 3 of the first embodiment except for the motor drive apparatus 33. In other words, the air conditioning apparatus according to the second embodiment has the motor drive apparatus 33A in place of the motor drive apparatus 33 of the first embodiment. In the second embodiment, a description is provided of difference from the first embodiment.

The motor drive apparatus 33A includes the capacitor 41 and the inverter 42. The inverter 42 includes the first output terminal 42U, the second output terminal 42V, and the third output terminal 42W. The motor drive apparatus 33A further includes the motor 43. The motor 43 includes six stator windings: the first stator winding 43U1, the second stator winding 43V1, the third stator winding 43W1, the fourth stator winding 43U2, the fifth stator winding 43V2, and the sixth stator winding 43W2. Each of the six stator windings is openable at both ends. Therefore, the connection state of the six stator windings is switchable.

The motor drive apparatus 33A further includes the neutral terminal 44, a connection state switching unit 45C that includes a function of switching the connection state of the six stator windings of the motor 43 among four types of connection states, and the motor control unit 46 that controls the inverter 42 and the connection state switching unit 45C. The motor control unit 46 includes the inverter control unit 47 that controls the inverter 42 and the contact control unit 48 that controls the connection state switching unit 45C.

Among the six stator windings of the motor 43, each of the first and fourth stator windings 43U1 and 43U2 has one of the ends connected to the first output terminal 42U of the inverter 42. Each of the second and fifth stator windings 43V1 and 43V2 has one of the ends connected to the second output terminal 42V of the inverter 42. Each of the third and sixth stator windings 43W1 and 43W2 has one of the ends connected to the third output terminal 42W of the inverter 42.

The first stator winding 43U1, the second stator winding 43V1, and the third stator winding 43W1 have the same resistance. The first stator winding 43U1, the second stator winding 43V1, and the third stator winding 43W1 also have the same inductance. The fourth stator winding 43U2, the fifth stator winding 43V2, and the sixth stator winding 43W2 have the same resistance. The fourth stator winding 43U2, the fifth stator winding 43V2, and the sixth stator winding 43W2 also have the same inductance. The resistance of the fourth stator winding 43U2 is the resistance of the first stator winding 43U1 of the first embodiment plus the resistance of the fourth stator winding 43U2 of the first embodiment in value. An inductance factor of the fourth stator winding 43U2 is an inductance factor of the first stator winding 43U1 of the first embodiment plus an inductance factor of the fourth stator winding 43U2 of the first embodiment in value.

The resistance of the fifth stator winding 43V2 is the resistance of the second stator winding 43V1 of the first embodiment plus the resistance of the fifth stator winding 43V2 of the first embodiment in value. An inductance factor of the fifth stator winding 43V2 is an inductance factor of the second stator winding 43V1 of the first embodiment plus an inductance factor of the fifth stator winding 43V2 of the first embodiment in value. The resistance of the sixth stator winding 43W2 is the resistance of the third stator winding 43W1 of the first embodiment plus the resistance of the sixth stator winding 43W2 of the first embodiment in value. An inductance factor of the sixth stator winding 43W2 is an inductance factor of the third stator winding 43W1 of the first embodiment plus an inductance factor of the sixth stator winding 43W2 of the first embodiment in value.

The connection state switching unit 45C includes the first relay 51, the second relay 52, the third relay 53, the fourth relay 54, the fifth relay 55, and the sixth relay 56. The first relay 51 includes the contact 61 connected to the other end of the first stator winding 43U1, the contact 71 connected to the other end of the fourth stator winding 43U2, the contact plate 81 connected to the fourth relay 54, and the coil 91 that operates the contact plate 81. In the absence of current through the coil 91, the contact plate 81 is connected to the contact 61. With the current flowing through the coil 91, the contact plate 81 is connected to the contact 71. The other end of the first stator winding 43U1 is the other one of the two ends of the first stator winding 43U1 that is not connected to the first output terminal 42U. The other end of the fourth stator winding 43U2 is the other one of the two ends of the fourth stator winding 43U2 that is not connected to the first output terminal 42U.

The second relay 52 includes the contact 62 connected to the other end of the second stator winding 43V1, the contact 72 connected to the other end of the fifth stator winding 43V2, the contact plate 82 connected to the fifth relay 55, and the coil 92 that operates the contact plate 82. In the absence of the current through the coil 92, the contact plate 82 is connected to the contact 62. With the current flowing through the coil 92, the contact plate 82 is connected to the contact 72. The other end of the second stator winding 43V1 is the other one of the two ends of the second stator winding 43V1 that is not connected to the second output terminal 42V. The other end of the fifth stator winding 43V2 is the other one of the two ends of the fifth stator winding 43V2 that is not connected to the second output terminal 42V.

The third relay 53 includes the contact 63 connected to the other end of the third stator winding 43W1, the contact 73 connected to the other end of the sixth stator winding 43W2, the contact plate 83 connected to the sixth relay 56, and the coil 93 that operates the contact plate 83. In the absence of the current through the coil 93, the contact plate 83 is connected to the contact 63. With the current flowing through the coil 93, the contact plate 83 is connected to the contact 73. The other end of the third stator winding 43W1 is the other one of the two ends of the third stator winding 43W1 that is not connected to the third output terminal 42W. The other end of the sixth stator winding 43W2 is the other one of the two ends of the sixth stator winding 43W2 that is not connected to the third output terminal 42W.

The fourth relay 54 includes the contact 64 connected to the neutral terminal 44, the contact 74 connected to the second output terminal 42V of the inverter 42, the contact plate 84 connected to the first relay 51, and the coil 94 that operates the contact plate 84. In the absence of the current through the coil 94, the contact plate 84 is connected to the contact 64. With the current flowing through the coil 94, the contact plate 84 is connected to the contact 74.

The fifth relay 55 includes the contact 65 connected to the neutral terminal 44, the contact 75 connected to the third output terminal 42W of the inverter 42, the contact plate 85 connected to the second relay 52, and the coil 95 that operates the contact plate 85. In the absence of the current through the coil 95, the contact plate 85 is connected to the contact 65. With the current flowing through the coil 95, the contact plate 85 is connected to the contact 75.

The sixth relay 56 includes the contact 66 connected to the neutral terminal 44, the contact 76 connected to the first output terminal 42U of the inverter 42, the contact plate 86 connected to the third relay 53, and the coil 96 that operates the contact plate 86. In the absence of the current through the coil 96, the contact plate 86 is connected to the contact 66. With the current flowing through the coil 96, the contact plate 86 is connected to the contact 76.

With the current flowing through none of the coils 91 to 96, the contact plates 81 to 86 are connected to the contacts 61 to 66, respectively. Accordingly, the first through third stator windings 43U1, 43V1, and 43W1 are connected, at the other ends, to the neutral terminal 44. With the current flowing through none of the coils 91 to 96, the connection state of the six stator windings of the motor 43 is a star connection state. The star connection state of the six stator windings with the current flowing through none of the coils 91 to 96 is described as "the connection state I".

With the current flowing through the coils 91 to 93 but not through the coils 94 to 96, the contact plates 81 to 83 are connected respectively to the contacts 71 to 73, and the contact plates 84 to 86 are connected respectively to the contacts 64 to 66. Accordingly, the fourth through sixth stator windings 43U2, 43V2, and 43W2 are connected, at the other ends, to the neutral terminal 44. With the current flowing through the coils 91 to 93 but not through the coils 94 to 96, the connection state of the six stator windings of the motor 43 is a star connection state. The star connection state of the six stator windings with the current flowing through the coils 91 to 93 but not through the coils 94 to 96 is described as "the connection state II".

With the current flowing through the coils 94 to 96 but not through the coils 91 to 93, the contact plates 81 to 83 are connected respectively to the contacts 61 to 63, and the contact plates 84 to 86 are connected respectively to the contacts 74 to 76. Accordingly, the one end of the first stator winding 43U1 is connected to the second output terminal 42V of the inverter 42, the one end of the second stator winding 43V1 is connected to the third output terminal 42W of the inverter 42, and the one end of the third stator winding 43W1 is connected to the first output terminal 42U of the inverter 42. With the current flowing through the coils 94 to 96 but not through the coils 91 to 93, the connection state of the six stator windings of the motor 43 is a delta connection state. The delta connection state of the six stator windings with the current flowing through the coils 94 to 96 but not through the coils 91 to 93 is described as "the connection state III".

With the current flowing through all of the coils 91 to 96, the contact plates 81 to 86 are connected to the contacts 71 to 76, respectively. Accordingly, the one end of the fourth stator winding 43U2 is connected to the second output terminal 42V of the inverter 42, the one end of the fifth stator winding 43V2 is connected to the third output terminal 42W of the inverter 42, and the one end of the sixth stator winding 43W2 is connected to the first output terminal 42U of the inverter 42. With the current flowing through all of the coils 91 to 96, the connection state of the six stator windings of the motor 43 is a delta connection state. The delta connection state of the six stator windings with the current flowing through all of the coils 91 to 96 is described as "the connection state IV".

As described above, the motor drive apparatus 33A in the outdoor unit of the air conditioning apparatus according to the second embodiment includes the connection state switching unit 45C that includes the function of switching the connection state of the six stator windings of the motor 43 among the four types of connection states. Therefore, the air conditioning apparatus according to the second embodiment is capable of reducing annual power consumption further as with the air conditioning apparatus 1 according to the first embodiment.

In the second embodiment, a terminal 81a to which the contact plate 81 of the first relay 51 is fixed is connected to a terminal 84a to which the contact plate 84 of the fourth relay 54 is fixed. Therefore, a wire that connects the first relay 51 and the fourth relay 54 is enabled to be relatively short in the air conditioning apparatus according to the second embodiment. Similarly, a terminal 82a to which the contact plate 82 of the second relay 52 is fixed is connected to a terminal 85a to which the contact plate 85 of the fifth relay 55 is fixed. Similarly, a terminal 83a to which the contact plate 83 of the third relay 53 is fixed is connected to a terminal 86a to which the contact plate 86 of the sixth relay 56 is fixed. Therefore, a wire that connects the second relay 52 and the fifth relay 55 and a wire that connects the third relay 53 and the sixth relay 56 are enabled to be relatively short in the air conditioning apparatus according to the second embodiment.

Since the wire connecting the first and fourth relays 51 and 54, the wire connecting the second and fifth relays 52 and 55, and the wire connecting the third and sixth relays 53 and 56 are relatively short, the air conditioning apparatus according to the second embodiment enables each of the wires to have relatively small resistance and relatively small inductance. Therefore, with each wire having the relatively small resistance and the relatively small inductance, the air conditioning apparatus according to the second embodiment eventually enables the output voltage from the inverter 42 to have relatively small amplitude and phase fluctuations when the motor 43 is driven. Consequently, the air conditioning apparatus according to the second embodiment enables improved control accuracy when the motor 43 is driven.

Since each of the coils 91 to 96 has resistance, when the current is passed through each of the coils 91 to 96, copper loss results from the resistance of each of the coils 91 to 96, thus causing the air conditioning apparatus to have increased loss. According to the first and second embodiments, no current flows through the coils 91 to 96 in the connection state I. Therefore, the connection state I does not cause the copper loss that results from the resistance of each of the coils 91 to 96. The connection state I corresponds to the intermediate cooling condition. Since the intermediate condition lasts longer than the rated condition, the air conditioning apparatuses according to the first and second embodiments both enable reduced power consumption during a cooling season, with the copper loss that results from the resistance of each of the coils 91 to 96 not caused at the intermediate cooling condition.

Third Embodiment

An air conditioning apparatus according to the third embodiment has the same configuration as the air conditioning apparatus 1 according to the first embodiment or the air conditioning apparatus according to the second embodiment. In the third embodiment, the connection state switching unit 45 or 45C causes each of the contact plates 84 to 86 of the fourth through sixth relays 54 to 56 to switch connectively between the contacts without suspending the motor 43, which drives the compressor 32. The switching of the contact plates 84 to 86 corresponds to switching between the connection state I and the connection state III and switching between the connection state II and the connection state IV. The switching corresponds to switching between the intermediate cooling condition and the rated cooling condition and switching between the intermediate heating condition and the rated heating condition.

In each of the heating and cooling operation modes, as an absolute difference between intake air temperature of the indoor unit 2 and a set temperature gets smaller based on a user's operation of the remote controller 4 and changes in air conditions around the indoor unit 2 and the outdoor unit 3, the air conditioning apparatus requires less refrigeration capacity. Accordingly, an operating condition of the air conditioning apparatus gets closer to the intermediate condition than the rated condition. When the absolute difference becomes smaller than a predetermined threshold, the outdoor control unit 34 gives a command to the motor control unit 46 for switching the connection state.

The connection state switching unit 45 or 45C causes the contact plate 84 of the fourth relay 54 to connectively switch from the contact 74 to the contact 64, causes the contact plate 85 of the fifth relay 55 to connectively switch from the contact 75 to the contact 65, and causes the contact plate 86 of the sixth relay 56 to connectively switch from the contact 76 to the contact 66. In this way, the connection state switching unit 45 or 45C switches the connection state of the six stator windings of the motor 43 from the delta connection state to the star connection state.

The air conditioning apparatus according to the third embodiment switches the connection state of the six stator windings of the motor 43 from the delta connection state to the star connection state without suspending the motor 43 that drives the compressor 32, that is to say, without suspending the compressor 32. The air conditioning apparatus according to the third embodiment switches the motor 43 from the relatively high rotational speed to the relatively low rotational speed, thus enabling the indoor temperature to get closer to the set temperature with relative quickness while providing a shorter time for the user to feel cold or hot.

The connection state switching unit 45 or 45C of the motor drive apparatus in the outdoor unit of the air conditioning apparatus according to the first, second, or third embodiment may include a function of switching, through the use of the first through six relays 51 to 56, the connection state of the six stator windings of the motor 43 without changing the operation mode of the air conditioning apparatus.

Figure 8:
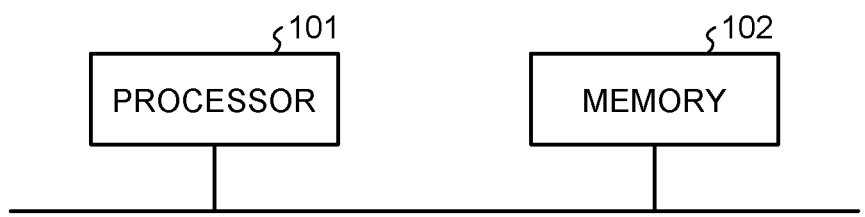
FIG. 8 is a diagram illustrating a processor with which an indoor control unit in an indoor unit of the air conditioning apparatus according to the first embodiment is partly or entirely implemented.

FIG. 8 is a diagram illustrating a processor 101 with which the indoor control unit 24 in the indoor unit 2 of the air conditioning apparatus 1 according to the first embodiment is partly or entirely implemented. In other words, the processor 101 that executes programs stored in a memory 102 may be used to implement part or all of the functions of the indoor control unit 24. The processor 101 is a central processing unit (CPU), a processing unit, an arithmetic unit, a microprocessor, or a digital signal processor (DSP). FIG. 8 also illustrates the memory 102.

When the processor 101 is used to implement the part or all of the functions of the indoor control unit 24, the part or all of the functions are implemented with the processor 101 and software, firmware, or a combination of software and firmware. The software or the firmware is described as the programs and is stored in the memory 102. The processor 101 implements the part or all of the functions of the indoor control unit 24 by reading and executing the programs stored in the memory 102.

When the part or all of the functions of the indoor control unit 24 are implemented by the processor 101, the memory 102 is included in the indoor unit 2 for storing the programs that eventually execute part or all of steps of the indoor control unit 24. The programs stored in the memory 102 can be said to cause a computer to execute the part or all of the steps or methods of the indoor control unit 24.

The memory 102 is, for example, a nonvolatile or volatile semiconductor memory such as a random-access memory (RAM), a read-only memory (ROM), a flash memory, an erasable programmable read-only memory (EPROM), or an electrically erasable programmable read-only memory (EEPROM) (registered trademark), a magnetic disk, a flexible disk, an optical disk, a compact disk, a mini disk, or a digital versatile disk (DVD).

Figure 9:
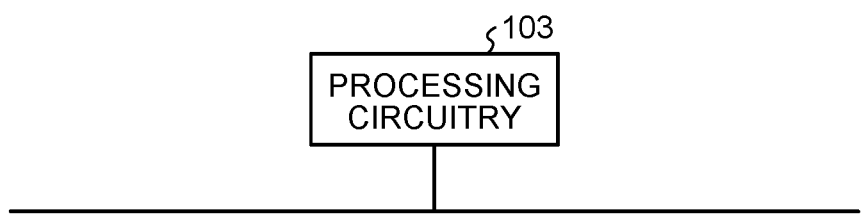
FIG. 9 is a diagram illustrating a processing circuitry with which the indoor control unit in the indoor unit of the air conditioning apparatus according to the first embodiment is partly or entirely implemented.

FIG. 9 is a diagram illustrating a processing circuitry 103 with which the indoor control unit 24 in the indoor unit 2 of the air conditioning apparatus 1 according to the first embodiment is partly or entirely implemented. In other words, the indoor control unit 24 may be partly or entirely implemented with the processing circuitry 103.

The processing circuitry 103 is dedicated hardware. The processing circuitry 103 is, for example, a single circuit, a composite circuit, a programmed processor, a parallel programmed processor, an application-specific integrated circuit (ASIC), a field-programmable gate array (FPGA), or a combination of these.

Part of the indoor control unit 24 may be dedicated hardware separate from a remaining part of the indoor control unit 24.

The functions of the indoor control unit 24 may partly be implemented by software or firmware, and a remaining part of those functions may be implemented by dedicated hardware. As described above, the functions of the indoor control unit 24 are implementable by the hardware, the software, the firmware or a combination of these.

The outdoor control unit 34 of each of the first and second embodiments may be partly or entirely implemented in terms of functionality with a processor that executes programs stored in a memory. The memory is similar to the memory 102. The processor is similar to the processor 101. The outdoor control unit 34 of each of the first and second embodiments may be partly or entirely implemented with a processing circuitry. The processing circuitry is similar to the processing circuitry 103.

The motor control unit 46 of each of the first and second embodiments may be partly or entirely implemented in terms of functionality with a processor that executes programs stored in a memory. The memory is similar to the memory 102. The processor is similar to the processor 101. The motor control unit 46 of each of the first and second embodiments may be partly or entirely implemented with a processing circuitry. The processing circuitry is similar to the processing circuitry 103.

The above configurations illustrated in the embodiments are illustrative, can be combined with other techniques that are publicly known, and can be partly omitted or changed without departing from the gist. The embodiments can be combined together.

The invention claimed is:

1. An air conditioning apparatus comprising:
   an indoor unit; and
   an outdoor unit including a compressor configured to compress a refrigerant and a motor drive apparatus configured to drive the compressor, wherein
   the motor drive apparatus includes
      an inverter configured to convert a direct-current voltage into an alternating-current voltage,
      a motor configured to operate on the alternating-current voltage from the inverter, the motor including six stator windings that are each openable at both ends, and
      a connection state switching unit configured to switch a connection state of the six stator windings of the motor among at least four types of connection states,
   each of the six stator windings has an adjusted number of turns that causes the motor to have, when an induced voltage of the motor reaches a maximum voltage that can be output by the inverter, a rotational speed that varies among the at least four types of connection states,
   the rotational speed is higher in a delta connection state than in a star connection state among the at least four types of connection states,
   the connection state switching unit includes a first relay, a second relay, a third relay, a fourth relay, a fifth relay, and a sixth relay to switch the connection state of the six stator windings, each of the first relay, the second relay, the third relay, the fourth relay, the fifth relay, and the sixth relay includes a respective contact plate, a terminal to which the respective contact plate of the first relay is fixed is directly connected to a terminal to which the respective contact plate of the fourth relay is fixed in each of the at least four types of connection states, a terminal to which the respective contact plate of the second relay is fixed is directly connected to a terminal to which the respective contact plate of the fifth relay is fixed in each of the at least four types of connection states, and a terminal to which the respective contact plate of the third relay is fixed is directly connected to a terminal to which the respective contact plate of the sixth relay is fixed in each of the at least four types of connection states.

2. The air conditioning apparatus according to claim 1, wherein the connection state switching unit causes the connection state of the six stator windings in a heating operation mode of the air conditioning apparatus to differ from the connection state of the six stator windings in a cooling operation mode of the air conditioning apparatus.

3. The air conditioning apparatus according to claim 2, wherein each of the first relay, the second relay, the third relay, the fourth relay, the fifth relay, and the sixth relay includes a respective coil configured to operate the respective contact plate, and when the six stator windings are in a connection state among the at least four types of connection states that causes an induced voltage of the motor to reach, at a lowest rotational speed of the motor, a maximum voltage that can be output by the inverter, no current flows through the respective coils of all of the first relay, the second relay, the third relay, the fourth relay, the fifth relay, and the sixth relay.

4. The air conditioning apparatus according to claim 3, wherein the connection state switching unit is configured to switch, through use of the first relay, the second relay, the third relay, the fourth relay, the fifth relay, and the sixth relay, the connection state of the six stator windings without causing an operation mode change to the air conditioning apparatus.

5. The air conditioning apparatus according to claim 1, wherein each of the first relay, the second relay, the third relay, the fourth relay, the fifth relay, and the sixth relay includes a respective coil configured to operate the respective contact plate, and when the six stator windings are in a connection state among the at least four types of connection states that causes an induced voltage of the motor to reach, at a lowest rotational speed of the motor, a maximum voltage that can be output by the inverter, no current flows through the respective coils of all of the first relay, the second relay, the third relay, the fourth relay, the fifth relay, and the sixth relay.

6. The air conditioning apparatus according to claim 5, wherein the connection state switching unit is configured to switch, through use of the first relay, the second relay, the third relay, the fourth relay, the fifth relay, and the sixth relay, the connection state of the six stator windings without causing an operation mode change to the air conditioning apparatus.

7. The air conditioning apparatus according to claim 1, wherein the connection state switching unit is configured to switch, through use of the first relay, the second relay, the third relay, the fourth relay, the fifth relay, and the sixth relay, the connection state of the six stator windings without causing an operation mode change to the air conditioning apparatus.

* * * * *